(12) United States Patent
Phinney et al.

(10) Patent No.: US 10,364,157 B2
(45) Date of Patent: *Jul. 30, 2019

(54) PROCESS FOR PRODUCING HIGH GRADE HYDROMAGNESITE AND MAGNESIUM OXIDE

(71) Applicant: Karnalyte Resources Inc., Saskatoon (CA)

(72) Inventors: Robin Phinney, Okotoks (CA); Jonathon Phinney, Martensville (CA); Siu Ma, Edmonton (CA)

(73) Assignee: Karnalyte Resources Inc., Saskatoon, Saskatchewan (CA)

( * ) Notice: Subject to any disclaimer, the term of this patent is extended or adjusted under 35 U.S.C. 154(b) by 193 days.

This patent is subject to a terminal disclaimer.

(21) Appl. No.: 15/126,188

(22) PCT Filed: Apr. 10, 2015

(86) PCT No.: PCT/CA2015/050298
§ 371 (c)(1),
(2) Date: Sep. 14, 2016

(87) PCT Pub. No.: WO2015/154194
PCT Pub. Date: Oct. 15, 2015

(65) Prior Publication Data
US 2017/0081205 A1    Mar. 23, 2017

Related U.S. Application Data

(60) Provisional application No. 61/977,840, filed on Apr. 10, 2014.

(51) Int. Cl.
*C01F 5/06* (2006.01)
*C01F 11/46* (2006.01)
(Continued)

(52) U.S. Cl.
CPC .......... *C01F 5/06* (2013.01); *C01F 5/24* (2013.01); *C01F 11/46* (2013.01); *C04B 2/102* (2013.01);
(Continued)

(58) Field of Classification Search
None
See application file for complete search history.

(56) References Cited

U.S. PATENT DOCUMENTS 3,980,753 A * 9/1976 Grill .................. C01F 5/02
423/161
5,240,692 A * 8/1993 Morifuji ............ C01F 5/24
423/430

(Continued)

OTHER PUBLICATIONS

Sui et al. .., "Improvement on the Processes of MgO Manufacture", Journal of Shanghai Jiaotong University, vol. 35, No. 4, Apr. 2001, pp. 595-598.*

(Continued)

*Primary Examiner* — Colleen P Dunn
(74) *Attorney, Agent, or Firm* — Craig J. Lervick; Larkin Hoffman Daly & Lindgren, Ltd.

(57) ABSTRACT

The present invention provides a process for producing high purity hydromagnesite from a source of magnesium chloride. The process involves preparation of a magnesium chloride brine of a specific concentration and reacting with sodium carbonate, while maintaining the reaction at a specific temperature range to form a hydromagnesite precipitate. The product can be calcined to generate high purity magnesium oxide compounds.

15 Claims, 2 Drawing Sheets

(51) Int. Cl.
  *C01F 5/24* (2006.01)
  *C04B 2/10* (2006.01)
(52) U.S. Cl.
  CPC ...... *C01P 2002/72* (2013.01); *C01P 2004/61* (2013.01); *C01P 2006/80* (2013.01)

(56) References Cited

U.S. PATENT DOCUMENTS 8,551,428 B2 * 10/2013 Pohl .......................... C01F 5/24
  423/165
2012/0267584 A1 * 10/2012 Pohl .......................... C01F 5/24
  252/601

OTHER PUBLICATIONS

Translation of the 2001 Sui et al. article, pp. 1-14.*
Written Opinion and International Search Report, dated Apr. 10, 2015, pp. 1-6.

* cited by examiner

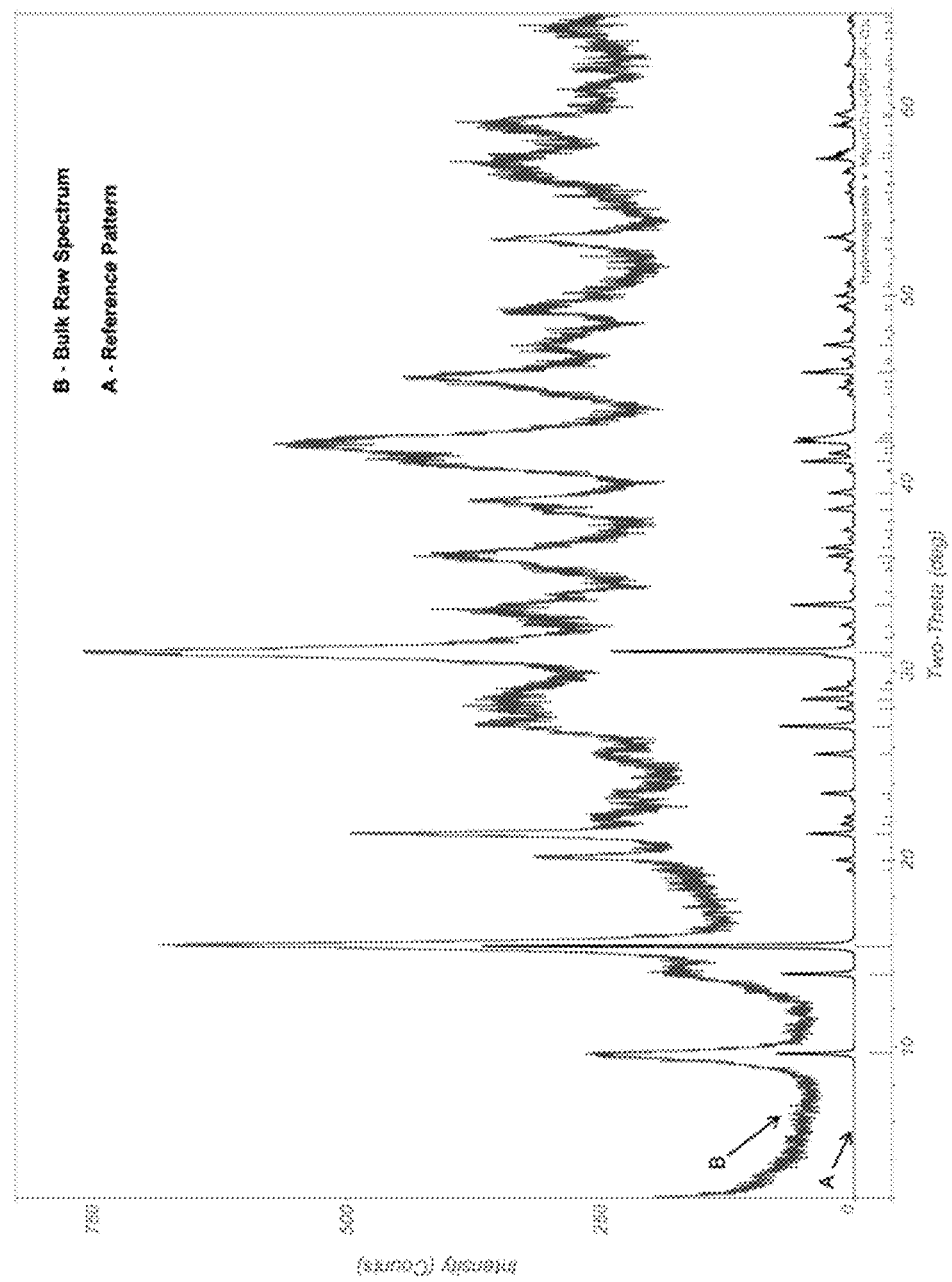

PROCESS FOR PRODUCING HIGH GRADE HYDROMAGNESITE AND MAGNESIUM OXIDE

FIELD OF THE INVENTION

The present invention relates to preparing high purity hydromagnesite and magnesium oxide, particularly, from a brine solution comprising magnesium chloride and calcium chloride

BACKGROUND OF THE INVENTION

Magnesium oxide and hydromagnesite compounds have many uses and find way into a number of products. Magnesium oxide (MgO) is commonly used in refractory, agricultural, chemical, construction, environmental, and other industrial applications. MgO is used as an insulator in industrial cables, as a basic refractory material for crucibles and as a principal fireproofing ingredient in construction materials. It is used as a reference white color in colorimetry, owing to its good diffusing and reflectivity properties. It is used extensively in heating as a component of tubular construction heating elements. The extensive use is due to its high dielectric strength and average thermal conductivity. MgO doping has been shown to effectively inhibit grain growth in ceramics and improve their fracture toughness by transforming the mechanism of crack growth at nanoscale In medicine, magnesium oxide is used as an antacid, magnesium supplement, and as a short-term laxative. It is also used to improve symptoms of indigestion. U.S Publication No. 20130059151 discloses use of magnesium oxide for pharmaceutical use wherein magnesium oxide when mixed with a drug that is unstable in acid, demonstrates high stabilizing effects on the drug while also demonstrating superior stability of the magnesium oxide per se.

Hydromagnesite is used in the paper, rubber and plastics industries for various purposes such as coatings, fillers, extenders and pigments for papermaking as well as flame-retardants in electrical wires and cables but also to impart resistance to chemicals in fibers. For example, EP 0 543 262, EP 0 393 813, JP 21 50 436, JP 22 55 843, JP 51 70 984, JP 50 98 085 and KR 2003/0040953 describe flame-retardant compositions comprising hydromagnesite in admixture with other magnesium compounds such as huntite, dolomite and/or magnesium hydroxide.

Hydromagnesite in combination with other magnesium compounds is used in the paper industries in order to impart printability, a high brightness at high opacity but also suitable smoothness and gloss to paper products such as magazines. In this respect, JP 2003/293291 describes coated paper produced by disposing an adhesive and a coating layer consisting mainly of at least one of huntite and hydromagnesite on base paper, wherein the resulting coated paper has high brightness, a high surface-masking effect and excellent printing suitability.

For these compounds, it is important to have a high yield, high purity and superior brightness to enable use in a multitude of industries at a lower cost than existing compounds. In one particular instance, if the quality of the hydromagnesite is high enough, it can be used to replace expensive pigments like titanium oxide.

European application 1984300 discloses a process for preparation of magnesium oxide from the reaction of magnesium salt and alkali/lime. The crude $Mg(OH)_2$ is directly calcined and then treated with water to disintegrate the mass spontaneously to yield a slurry and dissolve away the soluble salts.

U.S. Pat. No. 4,720,375 discloses a process for preparing magnesium oxide by calcining a magnesium ore to obtain magnesium oxide and thereafter leaching at least some of the magnesium oxide with ammonium chloride solution in a recovery stage in order to obtain ammonia and magnesium chloride in solution. Thereafter, the magnesium chloride solution is treated in a precipitation stage in order to precipitate magnesium carbonate trihydrate from the solution while forming ammonium chloride for delivery to the recovery stage and the obtained magnesium carbonate trihydrate is filtered, washed, dried and calcined in order to obtain magnesium oxide of high purity.

Besides the natural hydromagnesite, synthetic hydromagnesite (or precipitated magnesium carbonates) can be prepared. For example, U.S. Pat. Nos. 1,361,324, 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite.

U.S. Pat. No. 5,979,461 discloses a process to prepare compositions containing both, hydromagnesite and magnesium hydroxide, wherein magnesium hydroxide is mixed with water to form a suspension which is further contacted with carbon dioxide and an aqueous basic solution to form the corresponding mixture.

U.S. Pat. No. 8,551,428 discloses a process of preparing hydromagnesite, which comprises a) providing at least one magnesium oxide source, such as magnesium oxide, magnesite, dolomite, huntite, magnesium carbonate, magnesium hydroxide, brucite and mixtures thereof; b) providing gaseous $CO_2$ and/or carbonate-comprising anions; c) slaking of said magnesium oxide source of step a) to convert the magnesium oxide at least partially into magnesium hydroxide; d) contacting the obtained magnesium hydroxide of step c) with said gaseous $CO_2$ and/or carbonate-comprising anions of step b) to convert the magnesium hydroxide at least partially into precipitated nesquehonite; and e) treating the obtained precipitated nesquehonite of step d) in a heat-ageing step.

There is still a need in the art for providing alternative processes for preparing high quality hydromagnesite and magnesium oxide with high levels of purity and brightness. The greater the purity of the magnesium products, the higher the value and suitability for various industries which require very high purity chemicals, such as pharmaceutical industry.

SUMMARY OF THE INVENTION

One object of the present invention is to provide an improved process and method for producing high purity hydromagnesite and/or magnesium oxide compounds.

In accordance with an aspect of the present invention, there is provided a process for preparing hydromagnesite from a source of magnesium chloride, comprising: preparing a feedstock of magnesium chloride brine solution from said source of magnesium chloride, wherein said feedstock brine solution also comprises calcium chloride; mixing a sulfate salt into said feedstock brine solution to convert said calcium chloride into a calcium sulfate precipitate; removing said calcium sulfate precipitate from said brine solution; and mixing said brine solution produced in step c) with sodium carbonate, while maintaining the temperature at about 20° C. to 120° C. to form a hydromagnesite precipitate.

In accordance with another aspect of the present invention, there is provided a process for preparing hydromagnesite from a source of magnesium chloride, comprising: preparing a magnesium chloride brine solution from said source of magnesium chloride, wherein the concentration of said brine solution is up to about 35% by weight of magnesium chloride, mixing said brine solution with sodium carbonate while maintaining the temperature at about 20° C. to about 120° C. to form a hydromagnesite precipitate.

In accordance with another aspect of the present invention, there is provided a process for preparing a magnesium oxide product, comprising calcining the dried hydromagnesite precipitate obtained according to the process of the present invention to form the magnesium oxide product.

In accordance with another aspect of the present invention, there is provided a hydromagnesite product formed in accordance with the process defined in the present invention.

In accordance with another aspect of the present invention, there is provided a magnesium oxide product formed in accordance with the process defined in the present invention.

It has been found that by observing certain temperatures together with stirring and settling times that high quality products can be synthesized.

Having thus generally described the invention, reference will now be made to the accompanying drawings.

BRIEF DESCRIPTION OF THE DRAWING

FIG. 2 shown the XRD analysis for the hydromagnesite product obtained by an embodiment of the process of the present invention.

DETAILED DESCRIPTION OF THE PREFERRED EMBODIMENTS

Definitions

Figure 1:
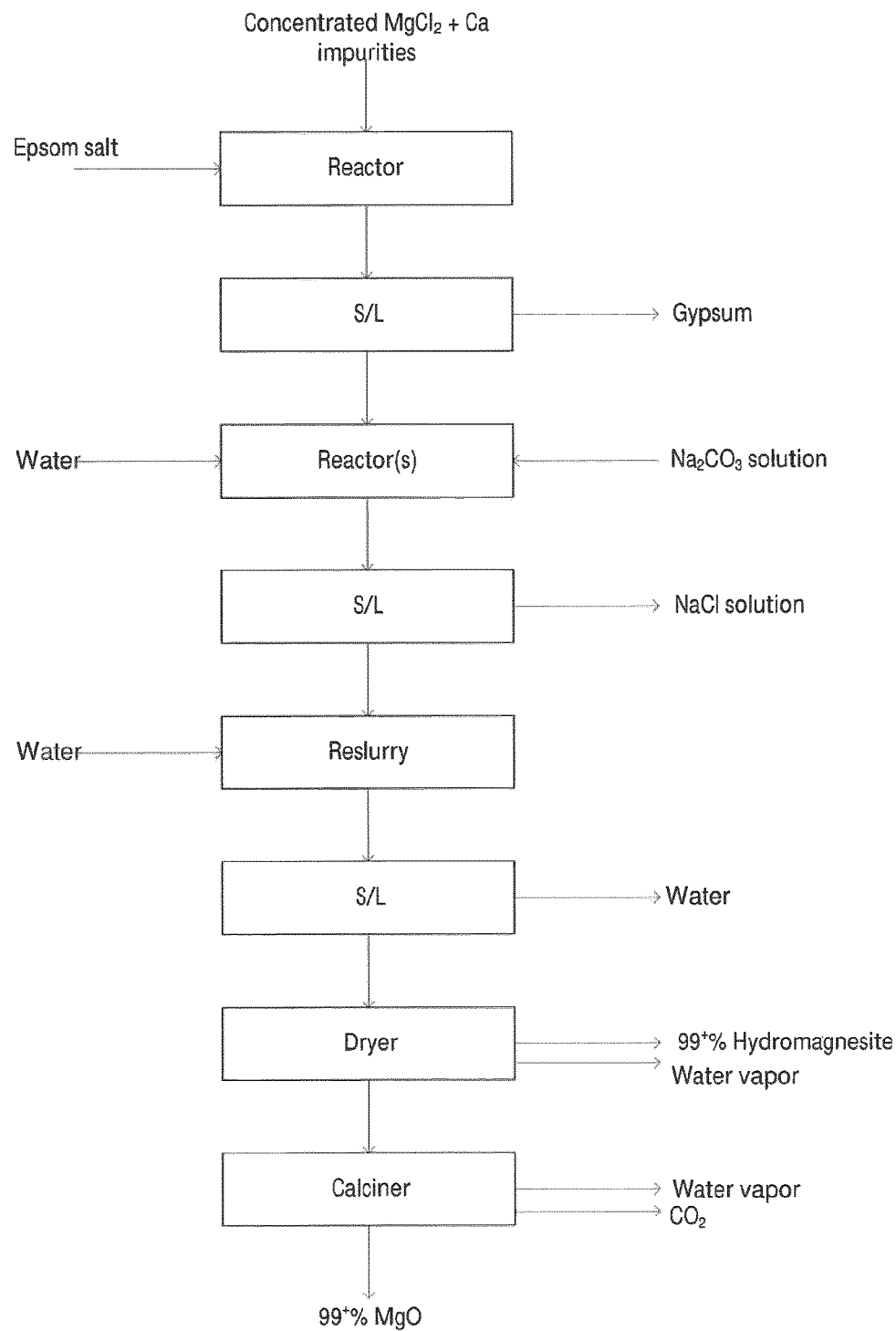
FIG. 1 depicts a simplified flow-chart illustrating an embodiment of the process according to the present invention.

Unless defined otherwise, all technical and scientific terms used herein have the same meaning as commonly understood by one of ordinary skill in the art to which this invention pertains. The term "Hydromagnesite" refers to magnesium carbonate with the chemical formula $Mg_5(CO_3)_4(OH)_2 \cdot 4H_2O$.

The term "precipitation" refers to the formation of a solid material in a solution during a chemical reaction.

A "suspension" or "slurry" comprises insoluble solids and water and optionally further additives and usually contains large amounts of solids and, thus, is more viscous and generally of higher density than the liquid from which it is formed.

The term "calcining" refers to a thermal treatment process applied to solid materials causing loss of moisture, reduction or oxidation, and the decomposition of carbonates and other compounds resulting in an oxide of the corresponding solid material.

As used herein, the term "about" refers to a +/−10% variation from the nominal value. It is to be understood that such a variation is always included in a given value provided herein, whether or not it is specifically referred to.

The present invention provides a process of preparing high purity hydromagnesite and magnesium oxide. The process of the present invention allows for the efficient and controlled production of hydromagnesite of a very high purity. According to the process of the present invention hydromagnesite having a purity of at least 99%, and varying particle sizes can be provided or prepared directly.

In one embodiment, the process of the present invention involves the preparation of a magnesium chloride brine solution from at least one source of magnesium chloride, and mixing the brine solution with sodium carbonate at a concentration and a temperature sufficient to form a hydromagnesite precipitate.

In accordance with the present invention, the magnesium chloride source can be provided in the form of magnesium chloride salt. It can also be provided in the form of a source of carnallite, a source of sylvinite, or any other mineral which can be processed to provide magnesium chloride. In one embodiment the source of magnesium chloride comprises a magnesium chloride brine solution obtained from evaporation of a brine solution obtained by dissolving a source of carnallite in water.

The magnesium chloride brine (as a source of magnesium chloride) can be a byproduct of other processes, for example, a process of obtaining potassium chloride from a source of carnallite as described in U.S. Pat. No. 8,282,898, the disclosure of which is incorporated herein by reference.

The concentration of the brine solution before mixing with sodium carbonate can be up to 35% by weight of magnesium chloride. In one embodiment, the concentration of the brine solution before addition of sodium carbonate is from about 10% to 20% by weight of magnesium chloride, preferably from about 15% by weight.

The sodium carbonate can be added as a solution by weight in water. In one embodiment, sodium carbonate is added as up to about 35% solution by weight in water, preferably about 5% to 15% solution by weight, more preferably about 10% solution by weight.

In one embodiment, the reaction temperature during mixing of sodium carbonate with the magnesium chloride brine is maintained at about 20° C. to about 120° C., preferably about 50° C. to about 100° C., more preferably about 60° C. to about 90° C., most preferably about 80° C., to form a hydromagnesite precipitate.

In one embodiment, the feedstock magnesium chloride brine solution also comprises calcium chloride. In one embodiment, for example when the feedstock brine solution is formed by dissolving from a magnesium chloride source which comprises calcium chloride impurities in water. Such a feedstock can comprise from about 15% to about 40% by weight magnesium chloride in water, preferably from about 25% to 35%. In one embodiment, the feedstock brine solution contains about 35% magnesium chloride.

In one embodiment, when calcium chloride is present, the feedstock magnesium chloride brine can comprise calcium chloride up to about 5% by weight. In one embodiment, the feed stock magnesium chloride brine comprises calcium chloride in the range of about 1.6% to about 2.0% by weight.

In one embodiment, the feedstock magnesium chloride brine also comprising calcium chloride is mixed with a sulfate salt. This mixing step results in the conversion of calcium chloride component of the feedstock brine into calcium sulfate precipitate (gypsum), which is removed from the remaining brine solution. In one embodiment, the mixing of the sulfate salt is carried out at a temperature of about 50° C. to about 100° C., preferably about 60° C. to about 90° C., more preferably about 80° C.

The sulfate salt can be magnesium sulfate or sodium sulfate, which can be added as a solid or as a concentrated solution in water. In one embodiment, the sulfate salt is magnesium sulfate septahydrate. In one embodiment, the calcium chloride impurities can be removed by adding approximately between 60 and 100 grams of magnesium sulfate per liter of brine.

In one embodiment, the brine solution remaining after the removal of calcium sulfate has a calcium chloride component of less than about 0.2% by weight, preferably less than about 0.1% by weight.

The remaining brine solution obtained after removal of calcium sulfate precipitate is then mixed with sodium carbonate to form a hydromagnesite precipitate, and sodium chloride which readily dissolves in water. The temperature of the reaction mixture is generally maintained in a range of about 20° C. to about 120° C., preferably about 50° C. to about 100° C., more preferably about 60° C. to about 90° C., and further more preferably about 80° C.

In one embodiment, the brine solution obtained after removal of calcium sulfate is heated at a temperature of about 50° C. to 100° C., preferably about 60° C. to about 90° C., more preferably about 80° C., before addition of sodium carbonate.

In one embodiment, the concentration of the remaining brine solution is adjusted to be about 10% to 20%, preferably about 15% by weight of magnesium chloride, before mixing with sodium carbonate. Sodium carbonate can be added as a solution in water. In one embodiment, sodium carbonate is added as an about 5% to about 15%, preferably about 10% solution by weight in water.

In one embodiment, the brine solution obtained from the magnesium chloride source can further comprise other water soluble impurities. In such a case, the process of the present invention further comprises the step of washing the hydromagnesite precipitate to remove the water soluble impurities. In one embodiment, the water soluble impurities comprise unreacted magnesium chloride, sodium chloride and/or potassium chloride. In one embodiment, sodium chloride and/or potassium chloride is present in an amount up to about 3% by weight. In one embodiment, sodium chloride is present in an amount about 2.0% to about 2.5% by weight. In one embodiment, potassium chloride is present in an amount of about 2.5% to about 3.0% by weight.

In one embodiment, the washing step further includes forming a slurry with the hydromagnesite precipitate in water and separating the precipitates via sold/liquid separation. The formation of slurry is conducted at a temperature of about 50° C. to 100° C. The washed hydromagnesite precipitate is then dried to form a dried hydromagnesite precipitate. The drying step is carried out at a temperature of about 100° C. to about 150° C., preferably about 110° C. to about 130° C., more preferably about 115° C.

Washing steps are carried out to removes residual potassium chloride & sodium chloride from initial brine, and sodium chloride formed during the reaction of ammonium chloride with sodium carbonate, from the hydromagnesite precipitate.

FIG. 1 depicts one embodiment of the process in accordance with the present invention, wherein a feedstock brine solution comprising magnesium chloride and calcium chloride, and optionally sodium chloride and potassium chloride is provided in a reactor. In one embodiment, in the feedstock brine solution, magnesium chloride is present in a concentration of about 27% to 34% and the calcium chloride is present in a concentration of about 1.6% to 2.0%. The sodium chloride concentration can be up to about 2.5% and the potassium chloride can be up to about 2.7%, all percentages being by weight.

Magnesium sulfate septahydrate is then added to the magnesium chloride brine solution in the reactor. The temperature of the mixture is maintained from about 50° C. to about 100° C., preferably about 60° C. to about 90° C., more preferably about 80° C. This mixing step results in the conversion of calcium chloride component of the magnesium chloride brine into calcium sulfate precipitates (gypsum). This mixture is stirred for up to 1 hr to effect the reaction. The calcium sulfate is then separated from the mother liquor via solid/liquid separation.

The remaining magnesium chloride brine is diluted to about 10% to about 20% by weight and subsequently heated at a temperature of about 50° C. to 100° C., preferably about 80° C. to about 100° C., more preferably about 80° C. At this point, about 5-15% solution of sodium carbonate is added to the diluted magnesium chloride brine with stirring being continuous and the addition of the sodium carbonate solution slowly added over the course of approximately up to 2 hours while the temperate is maintained within the range of about 50° C. to 100° C., preferably about 80° C. to about 100° C., more preferably about 80° C.

During this process, at least 90 to 100% of the stoichiometrically required sodium carbonate is used in the reaction. The mixture is retained in the mixing vessel for approximately 2 hours. Stirring is then ceased and the solid precipitate is allowed to settle to approximately one-third of the original volume. At least some of the liquid is then decanted from the reaction vessel and the remaining liquid is then filtered.

The washed cake is then re-slurried to approximately 50% of the density, and subsequently centrifuged. The re-slurrying operation is conducted at about 50° C. to 100° C., preferably about 80° C. The centrifuged product is then dried and transported for bagging. The product is dried at a temperature from about 100° C. to about 150° C. to produce a greater than 99% pure hydromagnesite.

The mixing of sodium carbonate with the brine solution can be done in a batch process or a continuous process.

The desired particle size and purity of hydromagnesite being obtained by the process of the present invention can be achieved and improved by specifically controlling and/or adjusting the process conditions during the preparation of the hydromagnesite.

Conveniently, the process of the present invention does not require extensive manipulation attributed to the processes used in the prior art; in the instant protocol, solubilities are conveniently manipulated to synthesize magnesium chloride brines which are diluted with progressive precipitation of unwanted compounds. This progressive precipitation results in very effective removal of calcium contamination from the magnesium chloride brine and hydromagnesite which is contributory to the remarkable purity achievable by practicing the technology of the instant invention.

The process of the present invention can result in hydromagnesite having particle size in the range of 3 to 100 microns. The temperature, residence time, rate of addition of $Na_2CO_3$ addition etc. is adjusted to precipitate as large of a particle size as possible (for example 20-50) microns. This particle size allows efficient settling, and increased ability to filter the particles from the mother liquor efficiently. This also allows for thorough cake washing with water to completely remove all of the soluble impurities. The wet cake contains much less water than a filter cake of a smaller particle size, and is efficiently dried. Large concrete like lumps are not formed with this larger particle size, any small lumps are friable and turn into a free flowing powder when touched.

The large particles are actually composed of agglomerations of 2-3 micron hydromagnesite particles. Dry milling and size classifying easily breaks these agglomerations down to the desired sizes used in pigments, fillers, etc. The product does not have to be shipped as liquid slurry, dramatically cutting shipping costs, and process issues.

The removal of the impurities such as calcium, sodium, potassium, etc., with the process of the present invention results in an extremely high purity product. As a result of this purity, brightness is increased significantly to 100.2 TAPPI, with almost no yellowness (no bleaching step is required). This brightness typically exceeds hi-grade pigment $TiO_2$. Replacing a portion of $TiO_2$ with this hydromagnesite actually increases the brightness overall, rather than the significant decrease found when using other fillers.

The very high purity of the hydromagnesite obtained via the process of the present invention (i.e. over 99%) makes the hydromagnesite an ideal feedstock for producing hi-grade magnesium oxide/magnesia (MgO), which in turn can be used as a feedstock for producing $Mg(OH)_2$ with the addition of water.

In one embodiment, the process of the present invention therefore further includes calcining the dried hydromagnesite precipitate obtained according to the process of the present invention to form a magnesium oxide product.

In one embodiment, the calcining of hydromagnesite precipitate is carried out at a temperature of about 475° C. to about 1000° C. In one embodiment, the calcining of hydromagnesite precipitate is carried out at a temperature of about 1000° C. to about 1500° C. In one embodiment, the calcining of hydromagnesite precipitate is carried out at a temperature of about 1500° C. to about 2800° C. In one embodiment, the calcining of hydromagnesite precipitate is carried out at a temperature over 2800° C.

As an option, depending upon the final use of the product, the hydromagnesite obtained via the process discussed above is calcined at a predetermined temperature to produce a host of magnesium oxide products. The calcination in the temperature ranges of about 475° C. to about 1000° C. produces "Reactive Magnesia". The calcination in the temperature ranges of about 1000° C. to about 1500° C. produces "Hard Burned Magnesia". The calcination in the temperature ranges of about 1500° C. to about 2800° C. produces "Dead Burned Magnesia", and the calcination over 2800° C. produces "Fused Magnesia".

The invention will now be described with reference to specific examples. It will be understood that the following examples are intended to describe embodiments of the invention and are not intended to limit the invention in any way.

EXAMPLES

Example 1

One liter of feedstock brine solution comprising 27% to 35% magnesium chloride, 1.6% to 2.0%, calcium chloride, 1.0% to 2.5% sodium chloride, and 1% to 2.7%, potassium chloride was provided in a reactor/vessel. Magnesium sulfate septahydrate was added to the feed stock magnesium chloride brine solution in an approximately 1:1 stoichiometric ratio relative to calcium chloride. The temperature of the mixture was maintained at about 80° C. The resulting calcium sulfate precipitate was removed via the solid/liquid separation.

The resulting magnesium chloride brine was diluted to about 15% by weight and subsequently heated at a temperature of about 80° C. At this point, an about 10% solution of sodium carbonate was added to the diluted brine solution, over the course of approximately up to 2 hours with stirring being continuous and while the temperature was maintained at about 80° C. to form the hydromagnesite precipitate.

The mixture was retained in the mixing vessel for approximately 2 hours after ceasing the stirring. The solid precipitate was allowed to settle to approximately one-third of the original volume and at least some of the liquid was then decanted from the reaction vessel.

The hydromagnesite precipitate was filtered and re-slurried to approximately 50% of the density, and subsequently centrifuged. The re-slurrying was conducted at about 80° C. The centrifuged product was then dried in at a temperature from about 100° C. to about 150° C. to produce a greater than 99% pure hydromagnesite The reaction was also conducted starting from 5, liters, 10 liters and 15 liters of feedstock brine solution.

The hydromagnesite obtained via the process discussed above was calcined at about 600° C. to about 1000° C. produce magnesium oxide product of different grades having a purity of greater than 99%.

Analytical Tests:

Purity of the products was determined by ICP-OES and ICP-MS analysis. This confirmed the level of impurities in the final product as well as the ratio of magnesium to sample weight.

The determination of hydromagnesite vs other magnesium compounds was determined by XRD analysis. This confirmed that the product was hydromagnesite and had the proper amount of waters of hydration. As shown in FIG. 2, the X-ray diffraction analysis of the tested sample shows the crystalline components of the sample consist of about 100% of the hydromagnesite.

Thermo Gravimetric Analysis was performed in order to determine the temperatures where the BMC would begin to decompose, and when waters of hydration were lost. Calcination temperatures were also determined using this test.

Differential thermal analysis was also performed using aluminum oxide as a reference in order to gain further information for the dryer.

Scanning electron microscope pictures and analysis determined the particle sizes and shapes and confirmed the crystal form and ability to mill into pigment sizes.

It will be appreciated by those skilled in the art that the numerical representations noted herein are exemplary.

All documents cited in the Detailed Description of Embodiments of the Invention are, in relevant part, incorporated herein by reference; the citation of any document is not to be construed as an admission that it is prior art with respect to the present invention.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of preparing hydromagnesite from a source of magnesium chloride, comprising:
    a) preparing a first brine solution from said source of magnesium chloride, wherein said first brine solution comprises magnesium chloride and calcium chloride;
    b) mixing a sulfate salt into said first brine solution capable of converting said calcium chloride into a calcium sulfate precipitate thereby forming said calcium sulfate precipitate and a second brine solution comprising magnesium chloride;

c) removing said calcium sulfate precipitate from said second brine solution; and d) mixing said second brine solution, after step c), with sodium carbonate, while maintaining the temperature at about 20° C. to about 120° C. to form a hydromagnesite precipitate, wherein said first brine solution contains from about 27% to about 35% by weight magnesium chloride in water, wherein said mixing of said sulfate salt is carried out at a temperature of about 60° C. to about 90° C.

2. The method of claim 1, wherein said first brine solution has a specific gravity from about 1.2 to about 1.35.

3. The method of claim 1, further comprising adjusting a magnesium chloride concentration of said second brine solution to be in a range of about 10% to about 20% by weight magnesium chloride in water, after removing calcium sulfate.

4. The method of claim 1, wherein said sodium carbonate is added as a solution of about 5% to about 15% by weight in water.

5. The method of claim 1, wherein said sulfate salt is magnesium sulfate or sodium sulfate and is provided as a solid or a solution in water.

6. The method of claim 1, wherein said mixing of said sulfate salt is carried out at a temperature of about 80° C.

7. The method of claim 1, wherein said second brine solution further comprises water soluble impurities, said method further comprising the step of washing said hydromagnesite precipitate to remove said water soluble impurities.

8. The method of claim 7, wherein said water soluble impurities comprise a least one of unreacted magnesium chloride, sodium chloride and potassium chloride.

9. The method of claim 7, wherein said step of washing includes the step of re-slurrying said hydromagnesite precipitate to an about 50% slurry by weight in water.

10. The method of claim 9, wherein said step of re-slurrying is carried out at a temperature of between about 50° C. and about 100° C.

11. The method of claim 7, further comprising the step of drying said hydromagnesite precipitate after washing to produce a dried hydromagnesite precipitate.

12. The method of claim 11, wherein said step of drying is carried out at a temperature of about 100° C. to about 150° C.

13. The method of claim 12, wherein said hydromagnesite precipitate has a purity of at least about 99% by weight.

14. The method of claim 1, wherein said hydromagnesite precipitate comprises particles having an average particle size from about 20 microns to about 50 microns.

15. The method of claim 1, wherein said first brine solution contains from about 27% to about 34% by weight magnesium chloride in water.

* * * * *